UNITED STATES PATENT OFFICE.

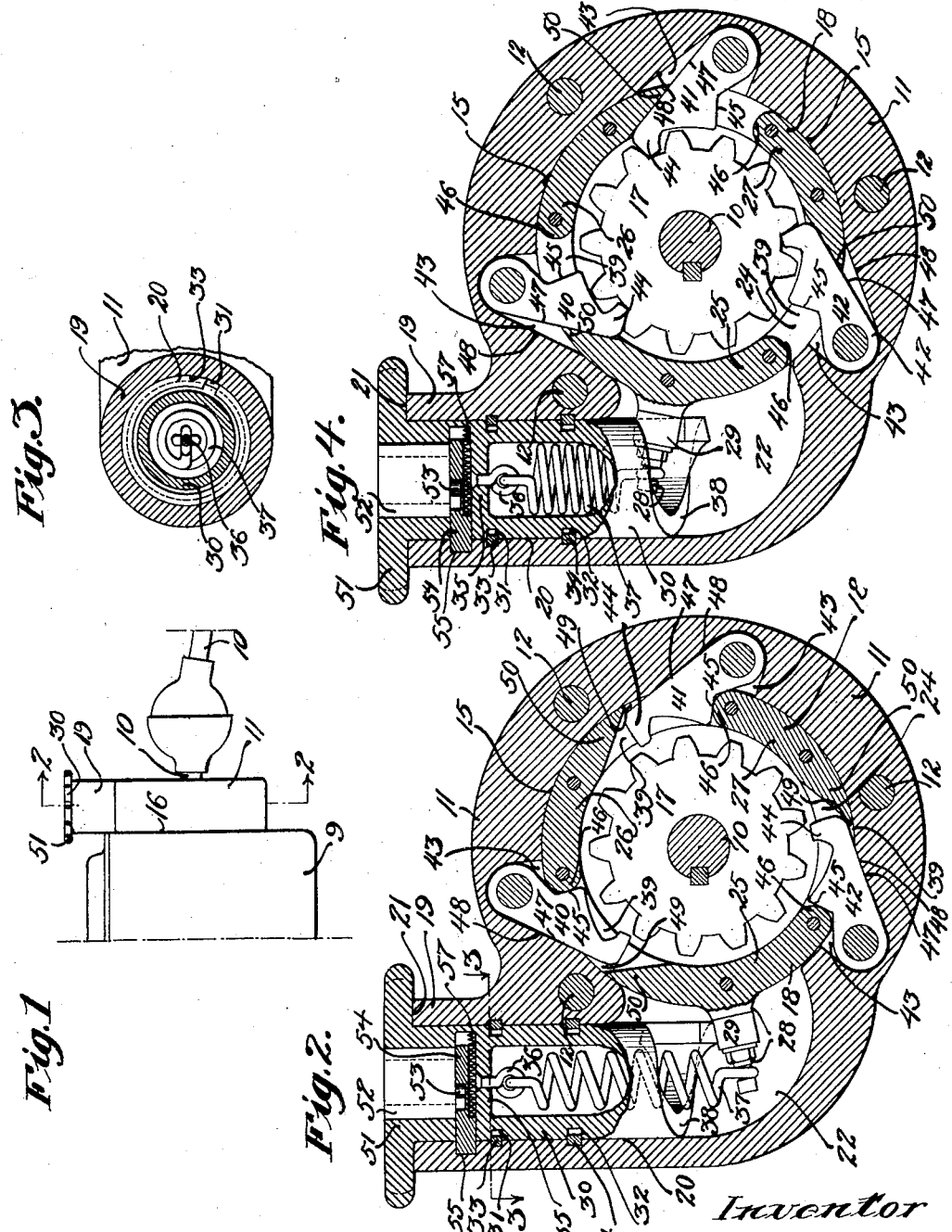

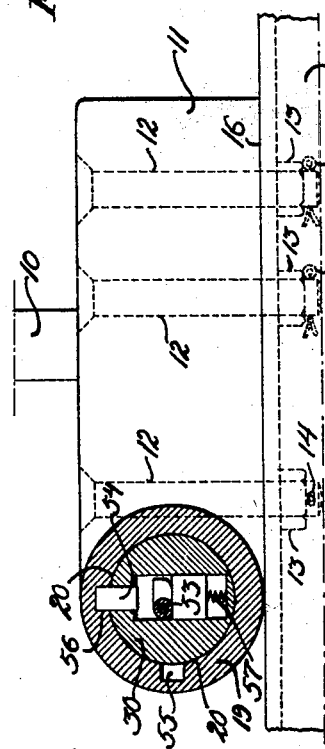

JESSEE MERCER WHITE, OF PHILADELPHIA, PENNSYLVANIA.

LOCKING DEVICE FOR AUTOMOBILES.

1,394,872.  Specification of Letters Patent.  Patented Oct. 25, 1921.

Application filed June 17, 1920. Serial No. 389,562.

*To all whom it may concern:*

Be it known that I, JESSEE M. WHITE, a citizen of the United States, residing at Philadelphia, in the county of Philadelphia and State of Pennsylvania, have invented certain new and useful Improvements in Locking Devices for Automobiles, of which the following is a specification.

The main object of my present invention is to prevent the theft of automobiles.

Another object of my present invention is to provide improved means for the above purpose which will be so constructed and arranged as to be practically inaccessible to a thief and at the same time will be operative, even when locked against forward movement of the automobile, to permit the automobile to be pushed backward as is often necessary in order to prevent the stopping of traffic or in cases of emergency where it is necessary to move an automobile from the place where it is standing.

Another object is to so construct my improved locking device that it will be operative to directly lock the driven shaft or in other words to lock the shaft between the transmission gearing and the driving wheels.

A still further object is to so make my improved locking device that it can be secured to the transmission gear casing in such manner that it will be practically invisible and cannot be detached from the transmission casing from the outside thereof.

A still further object is to so construct my improved locking device that it can be easily and quickly manipulated by the owner of the automobile or an authorized person.

Another object is to so arrange the parts of my improved locking device that if desired the driven shaft can be locked against movement in either direction so that if it is desired to lock the automobile against movement either backward or forward, it can be done.

Another object is to make my improved locking device of a strong, durable and comparatively simple construction which can be placed upon an automobile without in any way changing the structure of the parts thereof.

The objects, and other advantageous ends which will be described hereinafter, I attain in the following manner, reference being had to the accompanying drawings in which—

Figure 1 is a fragmentary elevation showing my improved device as it appears when secured to the transmission gear casing of an automobile and adapted to lock the driven shaft thereof, Fig. 2 is an enlarged sectional view taken on the line 2—2 of Fig. 1 showing the device in an unlocked position to permit the automobile to be moved either forwardly or backwardly, Fig. 3 is a sectional plan view taken on the line 3—3 of Fig. 2, Fig. 4 is a view of similar character to Fig. 2 showing the device in a locked position preventing the automobile from either moving forwardly or rearwardly, Fig. 5 is a view of similar character to Figs. 2 and 4 showing the device in a position which locks the automobile against forward movement but permits it to be moved backwardly, Fig. 6 is a sectional plan view taken on the line 6—6 of Fig. 5, Fig. 7 is a sectional elevation taken on the line 7—7 of Fig. 5, and Fig. 8 is a detail section of a locking or detent ring which forms a part of my invention.

Referring to the drawings, 9 represents a transmission gear casing of an automobile and 10 represents the driven shaft which projects out of the rear end of said transmission gear casing.

My improved locking device includes a housing 11, which is bolted, in the present instance, to the rear face of the transmission casing by bolts 12 which preferably have heads counter-sunk into the housing; said bolts at their opposite ends extending within the transmission gear casing and are provided with nuts 13; said nuts being locked by cotter pins 14. The housing 11 includes a cylindrical chamber 15 which is in the form of a cavity open at the side 16 of the housing; said side 16 being the side which abuts the end of the transmission gear casing. The driven shaft 10 extends through the chamber 15 and a toothed ratchet wheel 17 is locked to the driven shaft within the chamber 15.

A detent ring 18 fits within the chamber 15 and surrounds the ratchet wheel 17. The housing 11 has an upwardly extending branch 19 which is provided with a cylindrical bore 20; said bore extending downwardly from the top edge 21 of the branch and communicates at its bottom with a space 22 leading laterally from the cylindrical chamber 15. The detent ring 18 is made up in the present instance of two ring sections 23 and 24 which are spaced apart and between these ring sections are positioned three detent members 25, 26 and 27. These members are riveted or otherwise secured to the ring sections 23 and 24 as clearly shown in Fig. 8 and the member 25 has an outwardly projecting stud 28 upon which is mounted an anti-friction roller 29; said stud and anti-friction roller extending into the space 22 below the bore 20.

A hollow cylinder 30 rotatably fits within the bore 20 and has annular grooves 31 and 32 into which fit spring expansion rings 33 and 34; said expansion rings also being designed to spring part way in the annular grooves formed in the branch 19 and which communicate with the bore 20. In this manner the cylinder 30 is rotatably locked to the branch 19 of the housing 11 and during the inserting movement of said cylinder, the expansion rings are held in contracted position within the grooves of the cylinder and when the expansion rings are moved into register with the respective grooves in the branch, said expansion rings will expand into said latter grooves and thereby rotatably lock the cylinder in position. It will be noted that the ring 34 is wider than the upper groove in the branch and therefore during the inserting movement of the cylinder, the ring 34 cannot enter said upper groove but will pass thereover and down through the bore until it reaches the lower groove into which it will expand; said lower ring in the branch being sufficiently wide to permit the ring 34 to spring therein. The cylinder 30 includes a transverse partition 35 in which is swiveled an eyelet 36. A coiled spring 37 is positioned within the cylinder 30 and has one end connected to the eyelet 36 and the other end attached to the stud 28. The lower edge 38 of the cylinder 30 is made helical as clearly shown in Figs. 2, 4 and 5 and the spring 37 is adapted to keep the anti-friction roller 29 of the detent ring 18 in contact with the edge 38.

The members 25, 26 and 27 of the detent ring 18 have adjacent ends spaced apart to provide openings 39 into and through which free swinging portions of three locking pawls 40, 41 and 42 are adapted to swing under certain conditions hereinafter described. The locking pawls are pivotally mounted within recesses 43 in the housing 11 immediately adjacent the chamber 15. The pawls are preferably arranged as illustrated so that two of the pawls have their hooked ends 44 pointing downwardly such for example as the hooked ends of the pawls 40 and 41 so that said hooked ends of the pawls 40 and 41 will fall by gravity, when permitted to do so by the detent ring 18, as shown in Fig. 5 and thereby engage between the teeth of the ratchet wheel 17. Each of the pawls 40, 41 and 42 has a shoulder 45 adapted to be abutted by the adjacent end 46 of one of the detent members. The arrangement is such as shown in Fig. 2 that when the end 46 of a detent member is in engagement with the shoulder 45 that the opposite side edge 47 of each of the pawls will abut the inclined surface 48 of the respective recess 43. The pawls will abut the inclined surface 48 of the respective recess 43. The pawls, however, are of greater length than the lengths of the walls 48 of the recesses and project into the openings 39 so as to provide wedge shape crevices or cavities 49 into which the tapered ends 50 of said detent members can move under certain conditions during the operation of the device and thereby swing the hooked ends 44 of the pawls into locking engagement with the teeth of the ratchet wheel 17 as clearly shown in Fig. 4. Thus when the detent ring 18 is turned clockwise from the position shown in Fig. 2 to the position shown in Fig. 4, the pawls will be moved and held in positive locking engagement with the ratchet wheel 17. On the other hand as shown in Fig. 5 if the detent ring is moved into an intermediate position the pawls 40 and 41 will swing by gravity into engagement with the teeth of the ratchet wheel 17 and the shape of the ends 44 of the pawls is such with respect to the shape of the teeth of the ratchet that the ratchet wheel cannot be moved clockwise viewed from Fig. 5 but can be moved contra-clockwise since the teeth of the ratchet will merely push the pawls out of the path of the ratchet or in other words into the dot-and-dash line positions of said pawls 40 and 41 as illustrated in Fig. 5. The taper of the ends 50 is so slight that in the full locked position as shown in Fig. 4, it is impossible for the reverse or contra-clockwise movement of the ratchet wheel and driven shaft to oscillate the detent ring against the action of the spring 37.

The top of the cylinder 30 has a head or flange 51 which provides a hand-wheel; said hand wheel abutting the top edge 21 of the branch 19. This head has a key operated pin lock 52, which may be of the "pin" type, placed therein; said lock having a pin 53 adapted to engage within a bolt 54 which is slidably mounted within the cylinder and adapted to engage either of two notches 55 and 56 in the branch 19; said notches being clearly illustrated in Fig. 6. A spring 57 is preferably provided to move the bolt into either of the notches during rotation of the cylinder by the hand-wheel and the lock 52 can be operated by a key to cause the withdrawal of the bolt when it is desired to change the position of the cylinder during locking or unlocking movement.

The operation is as follows: During the normal running of the automobile the parts are in the position shown in Fig. 2 with the lowermost portion of the edge 38 of the cylinder 30 holding the stud 28 down against the action of the spring 37 and the ends 46 of the detent members of the detent ring 18 are in abutment with the shoulders 45 of the pawls holding the pawls all out of engagement with the ratchet wheel 17. If it is desired to lock the automobile against movement in either forward or rearward directions a key is inserted within the lock 52 to withdraw the bolt from the notch 55 and the cylinder can then be rotated by hand to permit the anti-friction roller 29 of the stud 28 to be moved by the spring 37 into engagement with the highest portion of the edge 38. This action will cause the ends 50 of the detent members to swing and hold the pawls into positive locking engagement with the ratchet wheel as shown in Fig. 4; said movement being effected by a complete rotation of the cylinder 30 so that when the key is removed the bolt will again enter the notch 55 and lock the cylinder to the housing so as to prevent movement by an unauthorized person.

If it is desired to merely lock the automobile against forward movement the detent ring can be moved into the position shown in Fig. 5 and the bolt 54 can be permitted to engage the notch 56. This permits movement of the detent ring by the spring 37 so that the ratchet wheel 17 will be positively locked in one direction and can be moved in an opposite direction as previously described.

The branch 19 may be made of sufficient length to permit it to pass upwardly through the floor of an automobile so that the head or hand-wheel of the cylinder is positioned above the floor level and may be readily grasped and a key may be easily inserted in the lock 52.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a device of the character described, the combination of a member normally rotatable in either direction; a selective lock; and means having portions optionally operative and controlled through the medium of said lock to effect the locking of said member against movement in either direction or the locking of said member against movement in one direction only; substantially as described.

2. The combination in an automobile of an operating shaft; a ratchet thereon; pawls for locking engagement with said ratchet; and controlling means for said pawls having portions movable in one direction to move and hold said pawls in locking engagement with the ratchet and other portions movable in an opposite direction to move said pawls out of engagement with said ratchet, said portions being spaced apart and movable into another position to permit the pawls to automatically engage said ratchet, said pawls and ratchet having parts so shaped that when in said latter position a movement of said ratchet in one direction will move the pawls out of locking engagement therewith and when moved in an opposite direction will jam against said pawls and thereby prevent further movement of said ratchet in said latter direction; substantially as described.

3. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; and means for oscillating said ring whereby said members serve to swing said pawls into and out of engagement with said ratchet; substantially as described.

4. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; and means for oscillating said ring whereby said members serve to swing said pawls into and out of engagement with said ratchet, certain of said pawls being adapted to swing by gravity into engagement with said ratchet independently of said members, said latter pawls and the ratchet being shaped to prevent movement of said ratchet in one direction when said pawls are in said latter position and to cause said latter pawls to be moved out of engagement with said ratchet when the latter is moved in an opposite direction; substantially as described.

5. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; actuating means movable within said housing; means for locking said actuating means in various positions, said actuating means having a portion adapted to oscillate said detent ring; and means for locking said actuating means in various positions; substantially as described.

6. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; actuating means mounted in said housing and having an actuating portion projecting outside of said housing an another portion within the housing designed to move said ring into various positions; and means for locking said actuating means in various positions; substantially as described.

7. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; means for oscillating said ring whereby said members serve to swing said pawls into and out of engagement with said ratchet, said means including a cylinder rotatably mounted in said housing and having a portion projecting to the outside of the housing, said ring having a portion projecting therefrom, said cylinder having a helical edge portion adapted to engage said projecting member and a spring for holding said projecting member into engagement with said helical edge; and means for locking said cylinder to the housing in various of its rotatable positions; substantially as described.

8. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; a cylinder rotatably mounted in said housing and having an actuating portion projecting outside of said housing, said ring having a portion projecting therefrom within the housing, said cylinder having a helical edge portion adapted to engage said projecting member; a spring within said cylinder and in swiveled connection therewith and with said projecting portion of the ring whereby said latter projecting portion is held in engagement with said helical edge; and means for locking said cylinder in various of its rotatable positions; substantially as described.

9. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; a cylinder rotatably mounted in said housing and having an actuating portion projecting to the outside of said housing, said ring having a portion projecting therefrom into the housing, said cylinder having a helical edge portion adapted to engage said projecting member; a spring within said cylinder and in swiveled connection therewith and with said projecting portion of the ring whereby said projecting portion is held in engagement with said helical edge, said housing having notches therein; a lock in said cylinder; and a bolt operatively connected to said lock and movable into any of said notches whereby the cylinders are locked in various positions; substantially as described.

10. The combination in an automobile of an operating shaft; a housing having a chamber through which said operating shaft extends; a ratchet secured to said shaft and located within said chamber; a detent ring adapted to oscillate within said chamber and having members spaced apart providing openings; pawls pivotally connected to said housing and having free portions capable of extending through said openings into engagement with said ratchet; and means for oscillating said ring; said free portions of the pawls including a shoulder and an extended edge, said members at one end having tapered portions adapted to engage between said extended edges and the housing, the members at their opposite edges being adapted to abut said shoulders; substantially as described.

11. A device of the character described including means having a bore and grooves extending inwardly from said bore and of different widths; and locking means rotatable within said bore, said locking means having rings adapted to spring into said grooves, one of said rings being wider than one of said grooves whereby during the inserting movement of said locking means into the bore, the wide ring will pass over the narrow groove and both rings will spring into the respective grooves; substantially as described.

In testimony whereof I have signed my name to this specification in the presence of two subscribing witnesses.

JESSEE MERCER WHITE.

Witnesses:
ELIZABETH GARBE,
CHAS. E. POTTS.